(12) United States Patent
Wang et al.

(10) Patent No.: US 12,724,012 B2
(45) Date of Patent: Sep. 1, 2026

(54) METHOD FOR DETERMINING PIPELINE VOLUME, LIQUID CHROMATOGRAPHY SYSTEM, AND PIPELINE VOLUME DETERMINATION DEVICE

(71) Applicants: Thermo Fisher Scientific (Shanghai) Instruments Co., Ltd., Shanghai (CN); Thermo Fisher Scientific (Suzhou) Instruments Co., Ltd., Suzhou (CN)

(72) Inventors: Hongfang Wang, Shanghai (CN); Gang Li, Shanghai (CN); Kun Fan, Shanghai (CN)

(73) Assignee: Thermo Fisher Scientific (Shanghai) Instruments Co., Ltd., Shanghai (CN)

( * ) Notice: Subject to any disclaimer, the term of this patent is extended or adjusted under 35 U.S.C. 154(b) by 526 days.

(21) Appl. No.: 18/009,953

(22) PCT Filed: Mar. 29, 2021

(86) PCT No.: PCT/CN2021/083667
§ 371 (c)(1),
(2) Date: Dec. 12, 2022

(87) PCT Pub. No.: WO2021/248984
PCT Pub. Date: Dec. 16, 2021

(65) Prior Publication Data

US 2023/0341359 A1 Oct. 26, 2023

(30) Foreign Application Priority Data

Jun. 12, 2020 (CN) ......................... 202010532930.7

(51) Int. Cl.
*G01F 1/7086* (2022.01)
*G01N 30/80* (2006.01)

(52) U.S. Cl.
CPC ........... *G01N 30/80* (2013.01); *G01F 1/7086* (2013.01)

(58) Field of Classification Search
None
See application file for complete search history.

(56) References Cited

U.S. PATENT DOCUMENTS 6,106,710 A * 8/2000 Fischer ................. G01N 30/82 210/659
6,406,633 B1 * 6/2002 Fischer ................. G01N 30/82 210/143

(Continued)

FOREIGN PATENT DOCUMENTS

CN 1627067 6/2005
CN 104931625 9/2015

(Continued)

OTHER PUBLICATIONS

Huber et al., "Principles in preparative HPLC," *Agilent Technologies, Inc.*, Publication No. 5989-6639EN, 85 pages (Apr. 2007).

(Continued)

*Primary Examiner* — Alexander A Mercado
(74) *Attorney, Agent, or Firm* — Klarquist Sparkman, LLP

(57) ABSTRACT

A method for determining the volume of a pipeline in a liquid chromatography system. The method comprises: inserting a detectable marker into a liquid flow of a liquid chromatograph; and by means of a time difference between a first moment at which a liquid chromatography detector detects the marker and a second moment at which a first sensor detects the marker, and a flow rate of the liquid flow, determining the total volume of pipelines between the liquid chromatography detector and the first sensor. By means of the method, a user can easily and flexibly determine the volume of a pipeline in a liquid chromatography system. In (Continued)

addition, further provided are a liquid chromatography system and a pipeline volume determination device.

18 Claims, 2 Drawing Sheets

(56) References Cited

U.S. PATENT DOCUMENTS

| | | | | |
|---|---|---|---|---|
| 6,767,467 | B2 * | 7/2004 | Fischer | G01N 30/82 210/198.2 |
| 8,877,051 | B2 | 11/2014 | Fogelman et al. | |
| 2002/0121468 | A1 | 9/2002 | Fischer et al. | |
| 2016/0069720 | A1 | 3/2016 | Njamfa | |
| 2016/0131617 | A1 | 5/2016 | Burnett et al. | |
| 2020/0386604 | A1 * | 12/2020 | Davis | G01N 29/222 |

FOREIGN PATENT DOCUMENTS

| | | |
|---|---|---|
| CN | 106053616 | 10/2016 |
| CN | 109765334 | 5/2019 |
| CN | 111505173 | 8/2020 |
| JP | H02150768 | 6/1990 |
| JP | 2014102164 | 6/2014 |

OTHER PUBLICATIONS

International Search Report and Written Opinion for related International Application No. PCT/CN2021/083667, mailed Jun. 25, 2021, 8 pages.

International Search Report and Written Opinion for related International Application No. PCT/CN2021/083669, mailed Jul. 7, 2021, 6 pages.

Extended European Search Report for related European Application No. 21821359.3, dated Jun. 18, 2024, 6 pages.

* cited by examiner

METHOD FOR DETERMINING PIPELINE VOLUME, LIQUID CHROMATOGRAPHY SYSTEM, AND PIPELINE VOLUME DETERMINATION DEVICE

CROSS REFERENCE TO RELATED APPLICATIONS

This is the U.S. National Stage of International Application No. PCT/CN2021/083667, filed Mar. 29, 2021, which was published in English under PCT Article 21(2), which in turn claims the benefit of CN Application No. 202010532930.7, filed Jun. 12, 2020, which is incorporated herein in its entirety.

TECHNICAL FIELD

The present invention generally relates to the field of liquid chromatography. Specifically, the present invention relates to a method for determining the volume of a pipeline in a liquid chromatography system, and also relates to a liquid chromatography system and a pipeline volume determination device.

BACKGROUND ART

High-performance liquid chromatography (HPLC) is an efficient and fast analytical separation technology developed rapidly in the 1970s, and is an important means for modern separation and testing. The separation principle of chromatography is as follows: when components dissolved in a mobile phase pass through a stationary phase, their retention time in the stationary phase is different due to their interactions (adsorption, distribution, exclusion and affinity) with the stationary phase in different magnitudes and strengths, and thereby they flow out of the stationary phase one after the other.

Liquid chromatographs manufactured on the basis of the above-mentioned high-performance liquid chromatography can be further classified into liquid-liquid chromatography (LLC) and liquid-solid chromatography (LSC) according to whether the stationary phase is liquid or solid. Modern liquid chromatographs may, for example, comprise high-pressure infusion pumps, sample injection systems, temperature control systems, chromatographic columns, detectors, signal recording systems, and other parts.

A fraction collector is a common auxiliary device of a liquid chromatography system, and is mainly used in pharmaceutical, food safety, scientific research and other fields. The fraction collector is mainly used to collect various target compounds separated by liquid chromatography. For example, when a standard pure sample needs to be provided or a certain component needs to be further identified, a fraction collector is often used to collect a desired component at the outlet of a chromatographic column, and the mobile phase in the fraction is removed to obtain a pure component. The fraction collector can perform cutting in a manually or automatically controlled manner according to elution signals of chromatographic peaks. The current trend of development is to automate sample injection and fraction collection, which may perform continuous operations and repeated separations.

The basic working principle of the fraction collector is as follows: after a liquid flow (for example, a target compound in a liquid phase) is separated by liquid chromatography, it enters the fraction collector in chronological order. The fraction collector switches a fraction valve according to the arrival time of the target compound, and collects a compound to be collected in a corresponding container. In addition, a valve can be selected to switch the flow path to waste liquid during a gap between collections of two fractions, thereby introducing an unwanted solvent or a mobile phase to the waste liquid.

There are a variety of pipelines for fluid communication in a liquid chromatography system. For example, the liquid chromatograph and the fraction collector need to be connected by means of a pipeline. In addition, various members or devices inside the fraction collector also need to be connected by means of pipelines.

For example, the above-mentioned pipelines may comprise a pipeline located between a liquid chromatography detector and the fraction valve of the fraction collector. After the target compound is separated by liquid chromatography, it enters the liquid chromatography detector, and then arrives at the fraction valve of the fraction collector through a pipeline. The time for the target compound to pass through this pipeline is actually the time it takes for the liquid flow from the liquid chromatography detector to arrive at the fraction valve of the fraction collector. In this case, the switching time of the fraction valve of the fraction collector is equal to the time for the target compound to arrive at the liquid phase detector plus the time for it to pass through this pipeline mentioned above. The time for the target compound to arrive at the detector can be accurately obtained from a chromatogram of the detector. Therefore, as long as the volume of this pipeline and the flow rate of the liquid flow are accurately measured, the accurate time for the target compound to arrive at the fraction valve can be obtained. If the time is inaccurate, the user's ability to fully recover the target compound will be severely affected. Therefore, it becomes particularly important to determine the volume of this pipeline from the liquid chromatography detector to the fraction valve of the fraction collector.

No matter which pipeline in a liquid chromatography system, there are mainly two conventional methods for measuring the volume of the pipeline:

1. The manufacturer provides a pipeline with a calibrated volume to users, but the users are not allowed to use their own pipelines in the liquid chromatography system.
2. The users use a calibration object with color and observe the calibration object with naked eyes. For example, a user can observe a corresponding position and time of a calibration object flowing through a pipeline including a fraction valve. For example, a stopwatch is generally used to determine the time for the calibration object to pass through this pipeline, and then the volume of this pipeline is calculated in combination with the flow rate of the liquid flow. See FIG. 1, for example.

However, for the first method, the users cannot use their own pipelines, which obviously cannot meet the needs of the users, resulting in a significant reduction in the flexibility of testing.

In addition, for the second method, it is to use visual observation and a stopwatch to measure the time. Obviously, the calculation of the pipeline volume is not too accurate. Moreover, because manual participation is required, it is usually very time-consuming and labor-intensive, which is not advantageous for detection and analysis processes.

For this reason, there is always a need in liquid chromatography systems for accurate and reliable determination of the volume of pipelines between devices and members, and this determination of the volume of pipelines is preferably automatic and inexpensive.

SUMMARY OF THE INVENTION

According to an aspect of the present invention, there is provided a method for determining the volume of a pipeline in a liquid chromatography system. The liquid chromatography system comprises a liquid chromatograph and a fraction collector connected thereto, the liquid chromatograph comprises a liquid chromatography detector located therein. A fraction collector comprises a fraction valve and a first sensor. The method comprises: inserting a detectable marker into a liquid flow of the liquid chromatograph; and by means of a time difference between a first moment at which the liquid chromatography detector detects the marker and a second moment at which the first sensor detects the marker, and the flow rate of the liquid flow, determining the total volume of pipelines between the liquid chromatography detector and the first sensor.

By means of the above-mentioned method, the volume of a pipeline in a liquid chromatography system can be automatically and quickly determined, especially the volume of a pipeline used to connect the liquid chromatography detector and the fraction collector selected by the user. Then, on the basis of the volume of this pipeline, the volume of other parts of pipeline included therein is determined. The volume of the pipeline determined by this method is very accurate, which thus provides reliable physical parameters for various operations of the liquid chromatography system.

According to another aspect of the present invention, there is provided a liquid chromatography system. The liquid chromatography system comprises: a liquid chromatograph comprising: a marker insertion device for inserting a detectable marker into a liquid flow of the liquid chromatograph, and a liquid chromatography detector located in the liquid chromatograph; a fraction collector comprising: a fraction valve arranged after the liquid chromatograph along a flow path direction, a first sensor arranged after the fraction valve along the flow path direction, and a control device configured to enable the total volume of pipelines between the liquid chromatography detector and the first sensor to be determined by means of a time difference between a first moment at which the liquid chromatography detector detects the marker and a second moment at which the first sensor detects the marker, and the flow rate of the liquid flow.

By means of the above-mentioned liquid chromatography system, a user can conveniently and flexibly determine the volume of a pipeline in a liquid chromatography system, and the determined volume of the pipeline is very accurate without the use of additional equipment and calibration compounds.

According to further another aspect of the present invention, there is provided a pipeline volume determination device. The pipeline volume determination device comprises: a liquid chromatography detector located in a liquid chromatograph; a fraction valve arranged after the liquid chromatograph along a flow path direction; a marker insertion device for inserting a detectable marker into the liquid flow of the liquid chromatograph; a first sensor arranged after the fraction valve along the flow path direction; and a control device configured to enable the total volume of pipelines between the liquid chromatography detector and the first sensor to be determined by means of a time difference between a first moment at which the liquid chromatography detector detects the marker and a second moment at which the first sensor detects the marker, and the flow rate of the liquid flow.

By means of the above-mentioned pipeline volume determination device, a user can accurately determine the volume of a pipeline in a liquid chromatography system, and the operation is automatic, fast and convenient.

BRIEF DESCRIPTION OF THE DRAWINGS

Other features and advantages of the present invention will become apparent from the following detailed description with reference to the accompanying drawings, wherein.

Figure 1:
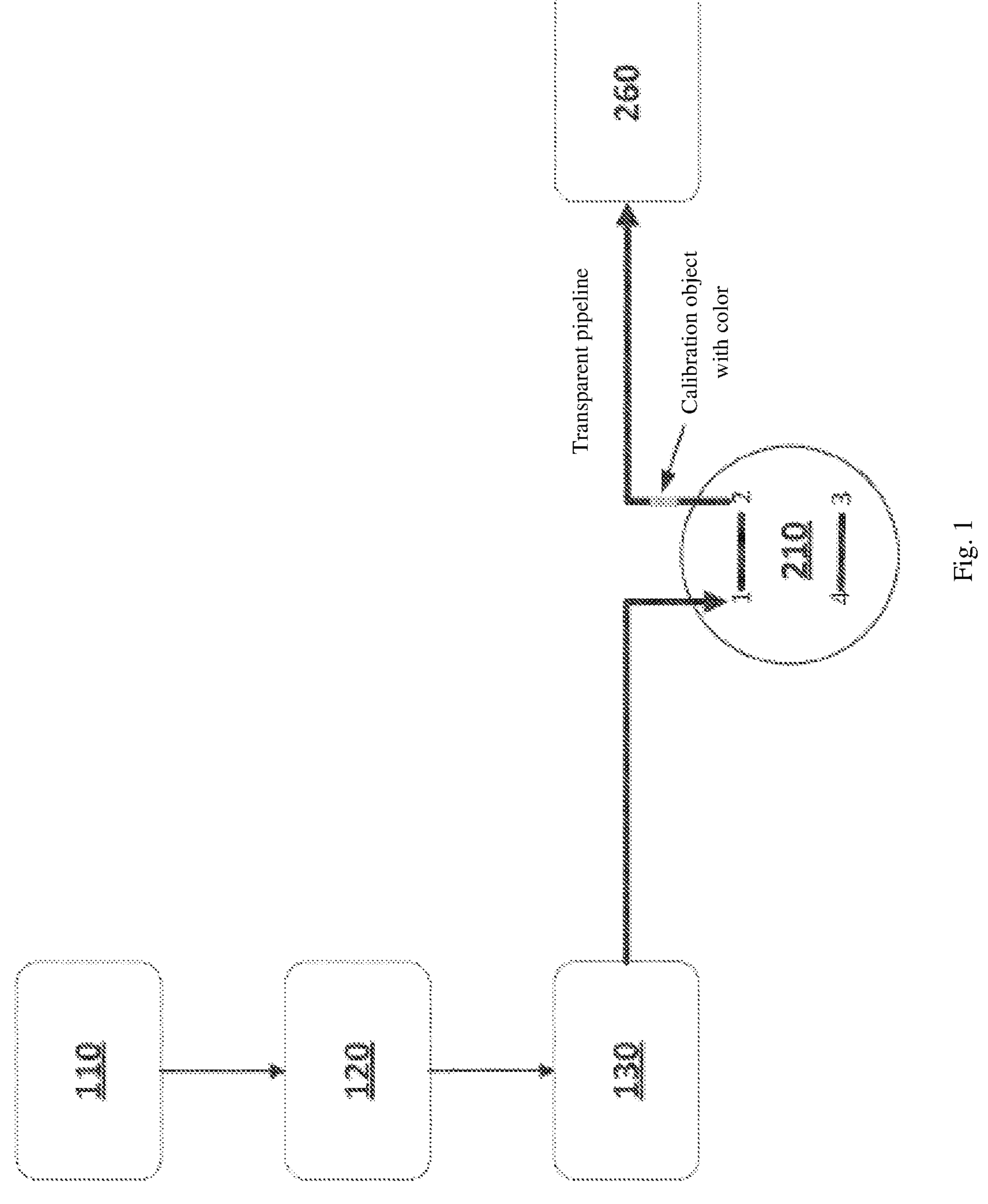
FIG. 1 schematically shows members and flow paths in a liquid chromatography system according to the prior art, wherein the time is determined by means of a user's visual observation of a calibration object with color flowing out of a detector and into a fraction valve.

It should be noted that the accompanying drawings referred to are not all drawn to scale, but rather are exaggerated to illustrate various aspects of the present invention. Moreover, in this regard, the accompanying drawings should not be construed as limiting.

LIST OF REFERENCE SIGNS

100 liquid chromatograph;
110 pump;
120 marker insertion device;
130 liquid chromatography detector;
200 fraction collector;
210 fraction valve;
220 first sensor;
230 second sensor;
240 collection needle;
250 flush pump;
260 waste liquid collector;
1 first port;
2 second port;
3 third port;
4 fourth port;
5 fifth port; and
6 sixth port.

DETAILED DESCRIPTION OF THE PREFERRED EMBODIMENTS

The liquid chromatography system described in the present invention refers to a system for separation and analysis based on the separation principle of chromatography (comprising traditional and modern high-performance liquid chromatography), especially a highly integrated automatic control system. In the present invention, a liquid chromatograph included in the liquid chromatography system may be various types of liquid chromatographs, and a fraction collector included in the liquid chromatography system may comprise various conventional types of fraction valves. Although the liquid chromatography system of the present invention is particularly suitable for applications such as pharmacy, food safety, laboratory scientific research, etc., it is not limited thereto.

In the present invention, various members or devices of the liquid chromatography system can be in fluid communication with each other (especially in the form of selective communication). For example, various members or devices may be fluidly connected by means of pipelines, but not limited to conventional forms of pipelines, and they may be fluidly connected by means of any connection structure having a certain volume. In other words, the term "pipeline" within the meaning of the present invention can also be interpreted more broadly, i.e. any fluid connection structure having a certain volume. In addition, hereinafter, when an "inlet", "outlet", "port" or "opening" of a member or device is involved, generally, because the port itself contains a very small volume, the volume will not be calculated within the volume of a pipeline.

In the present invention, a liquid flow will flow in a flow path of the liquid chromatography system. However, due to the physical flow of the fluid and possible variations in ambient temperature or pressure along the flow path, there may be slight variations in the actual flow rate of the fluid between points in the liquid chromatography system of the present invention. Here, the term "flow rate" of the liquid flow may refer to a volumetric flow rate. In addition, if the cross-section between various pipelines in the liquid chromatography system is constant, it can also be considered that the flow rate of the liquid flow in the liquid chromatography system is kept substantially constant.

In the present invention, the liquid flow flowing in the flow path of the liquid chromatography system may comprise substances to be separated, which are separated from each other (e.g., separated into various target compounds) after passing through a liquid chromatograph, and then are collected as fractions by a fraction collector according to needs.

Advantageously, various detectors or sensors of different modules or devices in the liquid chromatography system of the present invention can communicate with each other, thereby facilitating automatic control by the controller to calculate the required pipe volume or other required information.

In the present invention, serial numbers such as "first" and "second" do not necessarily refer to the order in time, but are only used to distinguish a variety of different components (e.g., sensors, ports, signals, etc.) or events with their importance not ranked.

In the present invention, a term "flow path direction" mainly refers to a flowing direction of liquid flow or other fluids in the pipeline. Furthermore, a term "before" means a member or device that is located (relatively) upstream when viewing along the flow path direction in the liquid chromatography system, and a term "after" means a member or device that is located (relatively) downstream when viewing along the flow path direction in the liquid chromatography system.

In addition, in the present invention, terms "sensor" and "detector" are each a device or member that can detect a marker, but it is not excluded that there are other functional or structural differences between the two.

Furthermore, in the present invention, "sensor" and "detector" themselves are not fluid members, but the simplified expression of a pipeline between them and other fluid members or the volume of the pipeline herein refers to a pipeline between a pipeline site where the "sensor" and "detector" are located and other fluid members or the volume of the pipeline, or a physical pipeline calculated from such a site where a liquid flow or other fluid in the pipeline is detected by the "sensor" and "detector" to a corresponding pipeline site of other fluid members or the volume of the pipeline.

Figure 2:
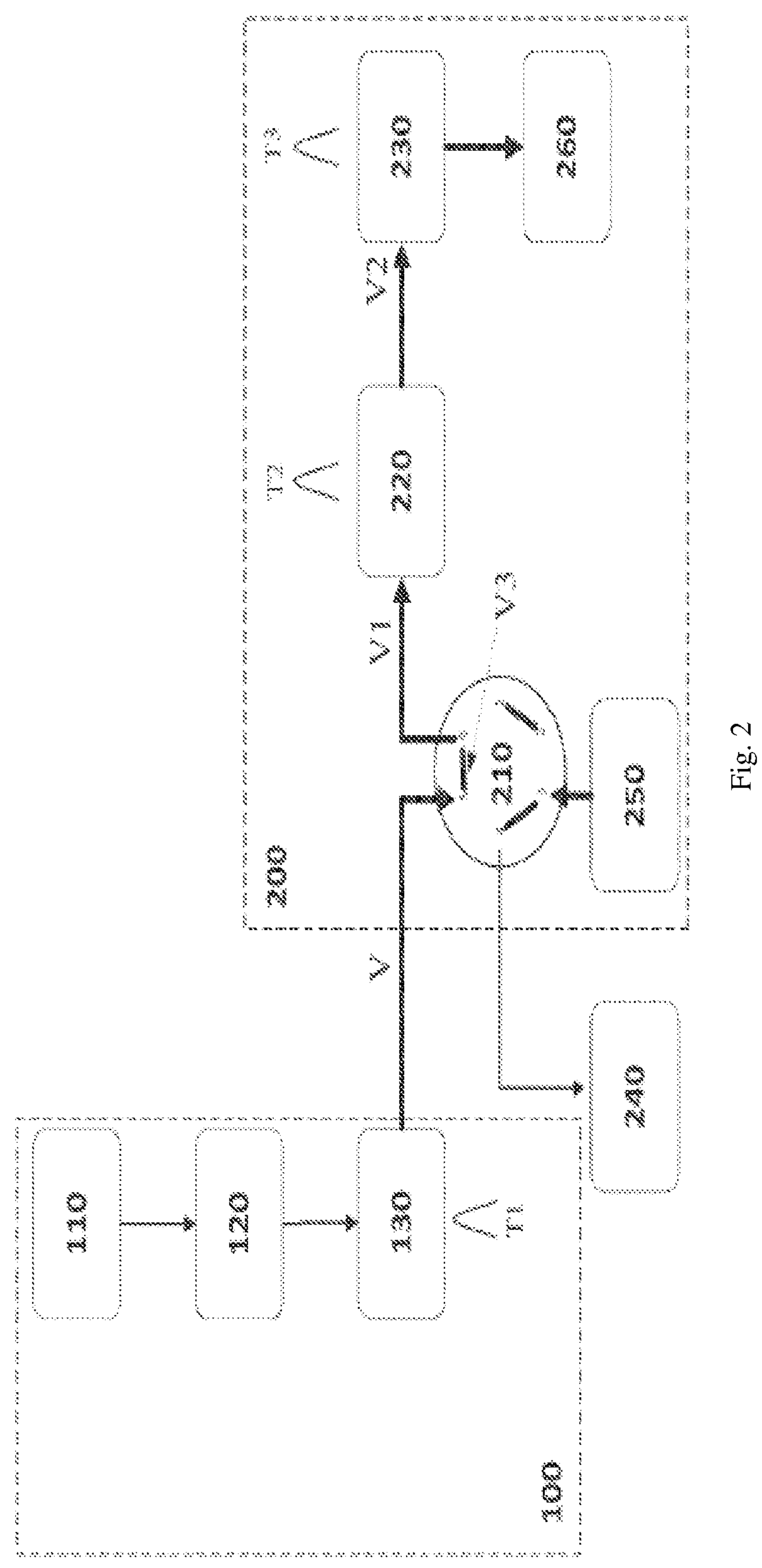
FIG. 2 schematically shows a liquid chromatography system according to an embodiment of the present invention, wherein the liquid chromatography system comprises a liquid chromatograph, a fraction valve, a first sensor, a second sensor and other members.

FIG. 2 shows a general layout of a liquid chromatography system according to an embodiment of the present invention. First of all, the liquid chromatography system may comprise a liquid chromatograph 100. The liquid chromatograph 100 may be associated or integrated with liquid conveying equipment not shown in the figure. The liquid conveying equipment may be used to convey various substances (e.g., samples, solvents, etc.) in a storage container to the liquid chromatograph 100. Furthermore, the liquid conveying equipment may or may not include a mixing device for mixing a plurality of substances before entering the liquid chromatograph 100.

The liquid chromatograph 100 generally comprises a column manager (not shown in the figure), and the column manager generally provides one or more chromatographic separation columns used to separate target compounds (e.g., sample-solvent compositions) with a controlled temperature environment. Each separation column is adapted to separate various components (or analytes) of a sample from each other as a liquid flow passes through it, and to elute the analytes (still carried by the liquid flow) from the column at different times.

Subsequently, the separated components travel from the column manager to a liquid chromatography detector 130 such as an ultraviolet-visible light detector (VWD or DAD) of the liquid chromatograph 100 to analyze various components. Therefore, the liquid chromatograph 100 comprises the liquid chromatography detector 130 located therein.

The liquid chromatograph 100 is in fluid communication with an inlet (also referred to as a "liquid inlet") of a fraction valve 210 of a fraction collector 200, which will be described in detail below, to recover the target compounds resulting from the separation. A pipeline between a pipeline position corresponding to the liquid chromatography detector 130 and the inlet of the fraction valve 210 has a fixed pipeline volume. Preferably, the pipeline position corresponding to the liquid chromatography detector 130 may be a pipeline position closest to the liquid chromatography detector 130 or a position through which a marker that can be detected by the liquid chromatograph flows.

A first moment at which a detectable marker arrives at the liquid chromatography detector 130 of the liquid chromatograph 100, which will be described in detail below, may be read out from a chromatogram of the liquid chromatography detector 130, for example. In a particular embodiment, when the detectable marker is inserted into the liquid flow, a different signal peak (e.g., a different voltage value) from the liquid flow may be instantly showed in the chromatogram of the liquid chromatography detector 130 of the liquid chromatograph 100, so that the detection of the marker or the first moment of arrival of the marker can be characterized.

In the present invention, a first signal may be generated when the marker is detected by the liquid chromatography detector 130 of the liquid chromatograph 100. The first signal represents at least the information of the first moment at which the liquid chromatography detector 130 detects the marker, and preferably, may also include other information (e.g., a voltage value). The first signal may be sent by the liquid chromatography detector 130 to a control device (not shown) of the liquid chromatography system.

In the present invention, a moment at which the detectable marker "arrives" at the liquid chromatography detector 130 or other sensor may be recorded, and preferably, it is sent to the control device in the form of a specific signal. Preferably, a moment at which a "vanguard" (e.g., a liquid-gas interface) of the marker is detected by the liquid chromatography detector 130 or other sensors can be recorded, and thus the recorded moment is independent of the volume of the inserted marker itself. Alternatively, in some applications, it is not excluded that a specific algorithm may be used to select a certain moment in a period of time during which the marker is detected as the moment when the marker is detected for subsequent calculation.

In addition, the liquid chromatograph 100 of the present invention may further comprise a pump 110 for pumping the liquid flow, so that the liquid flow can flow through the liquid chromatography detector 130, the fraction valve 210 and subsequent members at an approximately constant flow rate in the liquid chromatography system (when the pressure drop in the system flow path is relatively small). Although it is shown in FIG. 2 that the pump 110 is arranged within the liquid chromatograph 100, the pump 110 may also be arranged outside the liquid chromatograph.

When viewed along the flow path direction, the liquid chromatography system may comprise a fraction collector 200 arranged after the aforementioned liquid chromatograph 100. The fraction collector 200 may switch its fraction valve 210 according to the time of arrival of the liquid flow (e.g., various desired target compounds) from the liquid chromatograph 100, so that fractions to be collected are collected in corresponding containers.

For this reason, the fraction collector 200 of the present invention comprises a fraction valve 210. In some embodiments, the volume V of a pipeline between an inlet (e.g., a liquid inlet) of the fraction valve 210 and the liquid chromatography detector 130 of the liquid chromatograph 100 needs to be determined. This pipeline may be integrated within the fraction collector 200, but may also be provided independently of the fraction collector 200.

The fraction valve 210 is generally configured as a multi-port valve, and the fraction valve 210 may comprise a plurality of valve ports. According to a corresponding switching strategy of the fraction valve 210, one of these valve ports may be used as an inlet (e.g., a liquid inlet, a gas inlet or the like) of the fraction valve 210, and thus, the liquid flow from the liquid chromatograph 100 can flow into the fraction valve through the liquid inlet, and another one or others of these valve ports may be used as an outlet (e.g., a liquid discharge port) of the fraction valve 210 for fluid communication with subsequent pipelines and members.

When viewed along the flow path direction, the liquid chromatography system may comprise a first sensor 220 arranged after the fraction valve 210. Preferably, the first sensor 220 is provided on a flow path of the fraction collector 200 leading to a waste liquid collector 260. Alternatively, the first sensor 220 may also be provided on a flow path leading to other members (e.g., a suction pump). It can be understood that a pipeline is included between the first sensor 220 and the fraction valve 210 for fluid communication between the two. Preferably, the volume of the pipeline is known, and for example, it may be denoted as V1.

Optionally, the liquid chromatography system may further comprise a second sensor 230. Preferably, when viewed along the flow path direction, the second sensor 230 is arranged after the first sensor 220. However, the order of the first sensor and the second sensor is not limited to this, and the second sensor may also be located before the first sensor 220 (when viewed along the flow path direction). However, the second sensor 230 is located on the same flow path as the first sensor 220, e.g., the flow path leading to the waste liquid collector 260, as shown in FIG. 2 in an exemplary manner.

In the present invention, the first sensor 220 and the optional second sensor 230 may be any type of sensor capable of detecting the detectable marker in the liquid flow, including but not limited to a UV sensor or a refractive index sensor. Preferably, the first sensor and the second sensor 230 may emit electrical signals upon detection of the arrival of the marker. For example, a second signal may be generated when the detectable marker passes through the first sensor 220, and a third signal may be generated when it passes through the second sensor 230. These electrical signals may then be sent to a control device of the liquid chromatography system, which will be described in detail below, to facilitate the determination of the volume of the pipeline.

However, it can be understood that when the sensor or detector detects the marker, it may not emit a special electrical signal, but a corresponding moment (e.g., a first moment at which the liquid chromatography detector detects the marker, a second moment at which the first sensor 220 detects the marker, a third moment at which the second sensor detects the marker, etc.) at which the sensor or detector detects the marker is determined by the change of the electrical signal during its monitoring.

When the second sensor 230 is provided, the pipeline between the first sensor 220 and the second sensor 230 also comprises a known volume. The volume may be referred to as an inter-sensor pipeline volume, and may be denoted as V2 hereinafter.

As previously mentioned, in the present invention, the term "sensor/detector on a flow path of . . . " or "pipeline between . . . and the sensor/detector" means that the sensor/detector may not necessarily be on a flow path of a physical pipeline, but may be at a position through which the pipeline passes. In other words, the sensor/detector is not necessarily in fluid communication with a fluid device (e.g., a fraction valve) or a pipeline in the liquid chromatography system, but is simply at its position to some extent that the sensor/detector detects the marker flowing through the pipeline or the fluid device.

For example, although the first sensor 220 and the second sensor 230 are shown in the pipeline in FIG. 2, in practice, it is only indicated that the first sensor 220 and the second sensor 230 are at the position so that they can detect the marker flowing through this position, and do not physically exist on the flow path. For example, the first sensor 220 and the second sensor 230 may be positioned so that they can detect the fluid flow or the marker passing through the pipeline without hindrance. In other words, FIG. 2 is only a schematic view, and does not represent that the first sensor 220 and the second sensor 230 are located within the pipeline, but rather shows the approximate positioning of the first sensor 220 and the second sensor 230 along the flow path.

In order to enable switching to collect different fractions or to discharge waste liquid, the fraction valve 210 is advantageously configured as a switchable multi-port valve. A traditional four-port valve is shown in FIG. 1, whereas the multi-port valve is configured as a six-port valve in an embodiment of the present invention shown in FIG. 2. However, this is not required. For example, a traditional three-port valve or four-port valve can also achieve the objective of the present invention. More specifically, for the present invention, such a multi-port valve should have at least one port (a liquid inlet) that can be in fluid communication with an outlet (of a pipeline) of the liquid chromatograph 100, and another port (a liquid discharge port) that can be in communication with a flow path where the first sensor 220 and the optional second sensor 230 are located.

As shown in FIG. 2 in an exemplary manner, a fifth port 5 (the liquid inlet) of the fraction valve 210 may selectively be in fluid communication with the outlet (of the pipeline) of the liquid chromatograph 100, and a sixth port 6 (the liquid discharge port) of the fraction valve 210 may selectively be in fluid communication with a pipeline or flow path where the first sensor 220 is located.

In this embodiment, when the control device of the fraction collector 200 switches the fraction valve to a first position where its fifth port 5 and sixth port 6 are in communication, the liquid flow can flow from the outlet of the liquid chromatograph 100 into the fraction valve 210 through the pipeline, and then flows through the outlet (here, the sixth port or the liquid discharge port) of the fraction valve 210 to the pipeline where the first sensor 220 is located. It can be understood that the internal volume of the fraction valve 210 between the fifth port where the liquid flow flows in and the sixth port (the liquid discharge port) where the liquid flow flows out is generally known, and may be denoted as V3 here.

As shown in FIG. 2, the fraction valve 210 may also comprise a first port 1 to a fourth port 4 to achieve various functions. For example, when the fraction valve 210 needs to collect a fraction, the fraction valve 210 may be switched to a collection position where the fifth port 5 and the fourth port 4 can be in fluid communication. Thus, the fraction may flow into a designated container through the fifth port 5 and the fourth port 4 as well as a collection needle 240 (a kit) located outside the fraction valve 210. The collection needle 240 may be integrated into the fraction collector 200, but may also be provided independently of the fraction collector 200.

For another example, after the fraction collection is completed, the fraction valve 210 may be switched to a first position (also referred to as a waste liquid position) in which the fifth port (the liquid inlet) and the sixth port (the liquid discharge port) of the fraction valve 210 can be in fluid communication. At the first position, in addition to being used to determine the volume of the pipeline, the liquid flow from the liquid chromatograph 100 is also discharged to the waste liquid collector 260 through the fifth port (the liquid inlet) and the sixth port (the liquid discharge port).

Also, for example, a third port 3 of the fraction valve 210 may be connected to an external flush pump 250. Such a flush pump 250 may use a plunger pump to draw a precise volume of needle washing fluid and retain it in a pump body, so that when the fourth port 4 is in fluid communication with the third port 3, the needle washing fluid can be pushed into the needle for flushing. The flush pump 250 may be integrated into the fraction collector 200, but may also be provided independently of the fraction collector 200.

In order to determine the volume of a pipeline in a liquid chromatography system, a detectable marker needs to be inserted into a fluid flow, e.g., a fluid flow including a substance to be separated. In other words, the marker is typically inserted into the liquid flow within the liquid chromatograph 100, before the liquid chromatography detector 130, or at least at the liquid chromatography detector 130. Then, the liquid flow including the marker may flow from the liquid chromatography detector 130 of the liquid chromatograph 100 to the fraction valve 210, and then flow from the fraction valve 210 to the first sensor 220. When the liquid chromatography system comprises the second sensor 230, preferably, the liquid flow may flow from the first sensor 220 toward the second sensor 230 through a pipeline between the two.

As previously mentioned, the first moment will be recorded (and a first signal may also be generated) when the detectable marker in the liquid flow is detected by the liquid chromatography detector 130 of the liquid chromatograph 100, the second moment will be recorded (and a second signal may also be generated) when the marker is detected by the first sensor 220, and optionally, the third moment will be recorded (and a third signal may also be generated) when the marker is detected by the second sensor 230. It can be understood that the members generating the signals are not necessarily the sensors or the liquid chromatography detector 130 itself, but may be other equipment such as a controller.

For example, the liquid chromatography detector 130, the first sensor 220 and the second sensor 230 of the liquid chromatograph 100 may send the recorded moments to the control device of the liquid chromatography system. However, it is also possible that an electrical signal is generated at a corresponding moment, the generated electrical signal is sent to the control device, and then the control device records the time when the signal is received (i.e., a signal receiving moment). Since only the difference of the time when the marker is detected is used in the present invention, these control strategies are all feasible.

The control device of the liquid chromatography system may be any form of controller integrated in the liquid chromatography system, but it may also be the controller of the fraction collector 200, as long as there is communication between the liquid chromatography detector 130 and the sensors, and the control device.

The above-mentioned control device may be configured to enable the total volume of pipelines between the liquid chromatography detector 130 and the first sensor 220 to be determined by means of a time difference T2−T1 between the first moment at which the liquid chromatography detector detects the marker and the second moment at which the first sensor 220 detects the marker, and the flow rate of the liquid flow. The above-mentioned control device may also be configured to enable the flow rate of the liquid flow to be determined on the basis of a time difference T3−T2 between the second moment and the third moment at which the second sensor 230 detects the marker, and the inter-sensor pipeline volume V2.

In the present invention, the detectable marker may be, for example, a bubble, especially an air bubble, which is inserted into the liquid flow. Generally, the size of the inserted bubble is required to fill the entire diameter of the pipeline to avoid detection omissions due to sensor detection not detecting the bubble from certain angles of the pipeline. At the same time, the inserted bubble is also required to be large enough not to be absorbed into the liquid flow (for example, when the liquid flow includes a methanol component, the liquid flow may absorb part of the bubble).

Preferably, the marker such as the bubble is inserted into the fluid flow by a marker insertion device 120 (e.g., an automatic sampler). The marker insertion device 120 may be integrated within the liquid chromatograph 100 (see the layout shown in FIG. 2, for example), but may also be arranged outside the liquid chromatograph 100. In some embodiments, the marker insertion device 120 may comprise an injection valve. The injection valve is movable between an injection position and a non-injection position, so that it is switched to the injection position upon insertion of the marker according to an instruction of the control device or the like, thereby inserting the marker into the fluid flow.

Next, by means of FIG. 2, it will be explained in detail how to determine (or calibrate) the volume of a pipeline in the liquid chromatography system.

Before starting to determine the volume of the pipeline, by means of switching the fraction valve 210, the liquid flow may be enabled to flow on one flow path (i.e., within pipelines) where the liquid chromatograph 100, the fraction valve 210, and at least one sensor are located. For this reason, the fraction valve 210 needs to be switched to the aforementioned first position in which the fifth port 5 (the liquid inlet) and the sixth port 6 (the liquid discharge port) are in fluid communication.

When the determination is started, the detectable marker (preferably, an air bubble) is first inserted into the liquid flow of the liquid chromatograph 100. When the marker passes through the liquid chromatography detector 130 of the liquid chromatograph 100, since the physical properties of the marker itself are different from those of the liquid flow (for example, the refractive index of the liquid-gas interface is different), the first moment T1 when the liquid chromatography detector detects the marker may be recorded.

Similarly, when the marker passes through the first sensor 220, the second moment T2 when the first sensor detects the marker may be recorded.

During the presence of the second sensor 230, when the marker passes through the second sensor 230, the third moment T3 when the second sensor 230 detects the marker may be recorded. As already discussed previously, these moments may not be recorded by the sensors or by the liquid chromatography detector 130 itself, but rather may be generated by the control device, all of which are within the scope of protection of the present invention.

Therefore, the time difference T2−T1 between the first moment when the liquid chromatography detector detects the marker and the second moment when the first sensor 220 detects the marker can be determined.

In addition, the flow rate of the liquid flow including the detectable marker flowing in the liquid chromatography system is further required to be determined.

It can be understood that the marker flows through the entire flow path between the liquid chromatography detector 130 of the liquid chromatograph 100 and the first sensor 220 during this period of time T2−T1. Therefore, when the flow rate of the liquid flow is determined, the total volume of the pipelines between the liquid chromatography detector 130 of the liquid chromatograph 100 and the first sensor 220 can be calculated by multiplying the time difference T2−T1 by the volumetric flow rate of the liquid flow. The determination of the total volume can provide a time basis for various operations of the liquid chromatography system, and it belongs to important physical parameters of the liquid chromatography system.

Furthermore, since the pipeline between the liquid inlet of the fraction valve 210 and the first sensor 220 has a known predetermined volume, the volume of the pipeline between the liquid inlet of the fraction valve 210 and the liquid chromatography detector is determined on the basis of the total volume and the predetermined volume. For example, the volume of the pipeline between the liquid chromatography detector 130 and the liquid inlet of the fraction valve 210 may be calculated by subtracting the predetermined volume of the pipeline between the liquid inlet of the fraction valve 210 and the first sensor 220 from the calculated total volume. The accurate pipeline volume thus calculated can help the fraction collector 200 to fully recover target compounds.

This method of determining the volume of the pipeline is not affected by the change of the inner diameter of the pipeline, because in this method, the volumetric flow rate (unit: ml/min) of the liquid flow in the pipeline may be accurately measured. During measuring, a pipeline with a calibrated volume is used, the time for the marker to pass through this pipeline is then accurately measured, and the volume is divided by the time to obtain the accurate volume flow of the liquid flow. Moreover, the volumetric flow rate of the liquid flow at any section of several pipelines connected in series is the same, and is not affected by the shape change in the pipelines. Therefore, the measured volumetric flow rate is equal to the volumetric flow rate of the liquid flow in this pipeline, and then the volume of this pipeline can be accurately obtained using the volumetric flow rate and the time when the marker passes through this pipeline.

Furthermore, in order to determine the flow rate of the liquid flow, a plurality of methods may be used. In some embodiments, the pump flow rate (i.e., the working flow rate) of the pump 110 in the liquid chromatograph 100 may be used as the aforementioned flow rate (which is in unit of ml/min, for example) of the liquid flow. In this case, the flow rate is generally known.

In other embodiments, the direct use of the pump flow rate may result in insufficient calculation accuracy (for example, because the actual working flow rate of the pump 110 cannot be reached), and then the flow rate (which may be in unit of ml/min, for example) of the liquid flow needs to be calculated at the same time.

In this case, the liquid chromatography system needs to comprise the aforementioned second sensor 230. As shown in FIG. 2, the moment when the marker is detected by the first sensor 220 in the fraction collector 200 is the second moment T2, and the moment when the marker is detected by the second sensor 230 is the third moment T3. If the volume of the pipeline between the two sensors is the inter-sensor pipeline volume V2, then the accurate volumetric flow rate of the liquid flow is equal to the inter-sensor line volume V2 divided by T3−T2.

It can be noted that in the embodiment shown in FIG. 2, the known predetermined volume may comprise the known volume V3 between the liquid inlet (i.e., the fifth port 5) of the fraction valve 210 and its liquid discharge port (i.e., the sixth port 6), and the known volume V1 (which is in unit of ml/min, for example) of the pipeline between the liquid discharge port of the fraction valve 210 and the first sensor 220.

Therefore, when the pump flow rate is not directly used to determine the volumetric flow rate of the liquid flow, the total volume of the pipelines between the liquid chromatography detector 130 and the first sensor 220, and the volume of the pipeline between the liquid chromatography detector 130 and the liquid inlet of the fraction valve 210 can be calculated by the following formulas:

for the flow rate of the liquid flow, Flow=V2/(T3−T2);

for the total volume (of the pipelines between the liquid chromatography detector and the first sensor), $V_{total}$=Flow*(T2−T1)=V2*(T2−T1)/(T3−T2); and for the volume of the pipeline (between the liquid chromatography detector and the liquid inlet of the fraction valve), V=Flow*(T2−T1)−V1−V3=V2*(T2−T1)/(T3−T2)−V1−V3.

Thus, the automatic, fast and accurate automatic determination of the total volume of the pipelines and the volume of a specific pipeline can be realized by introducing two sensors into the fraction collector 200.

In general, the main innovation of the present invention is at least as follows. On the one hand, the existing modules of the liquid chromatograph are used to determine the volume of the pipeline, and the marker such as the bubble is used for determination without using additional equipment and calibration compounds. On the other hand, the flow rate can be accurately measured, so that the determination of the total volume and the volume of a specific pipeline is more accurate.

It can be understood that the present invention can provide a pipeline volume determination device, which comprises a liquid chromatography detector 130 (that is, it does not need to comprise the entire liquid chromatograph 100), a fraction valve 210 (that is, it does not need to comprise the entire fraction collector 200), a marker insertion device (which may be integrated within the liquid chromatograph 100 or provided independently of the liquid chromatograph 100), a first sensor 220 and a corresponding control device.

Although various embodiments of the present invention have been described in the accompanying drawings with reference to examples used in liquid chromatography systems to determine the volume of the pipelines, it should be understood that the embodiments within the scope of protection of the present invention can be applied to other applications with similar structures and/or functions that require calibration of the volume of pipelines, such as pipeline volume calibration used in other fields of biology, chemistry, testing, and the like.

The foregoing description has given the numerous features and advantages, comprising various alternative embodiments, and details of the structures and functions of the devices and methods. This document is intended to be exemplary, and not exhaustive or limiting.

It will be apparent to a person skilled in the art that various modifications may be made, particularly in aspects of structures, materials, elements, parts, shapes, dimensions and arrangements of members, to the full scope indicated by the broad generic meanings of the terms as expressed in the appended claims, including incorporation of these aspects within the scope of the principles described herein. To the extent that the various modifications do not depart from the spirit and scope of the appended claims, they are intended to be included herein.

The invention claimed is:

1. A method for determining the volume of a pipeline in a liquid chromatography system, the liquid chromatography system comprising a liquid chromatograph and a fraction collector connected thereto, the liquid chromatograph comprising a liquid chromatography detector located therein, and the fraction collector comprising a fraction valve, a collection needle, and a first sensor, wherein the fraction valve defines at least two separate downstream flow paths comprising a waste flow path leading to a waste liquid collector and a collection flow path leading to the collection needle, wherein the first sensor is provided on the waste flow path, characterized in that the method comprises:

inserting a detectable marker into a liquid flow of the liquid chromatograph, wherein the detectable marker is a bubble, and wherein the marker is inserted into the liquid flow within the liquid chromatograph, before the liquid chromatography detector, or at least at the liquid chromatography detector; and by means of a time difference (T2−T1) between a first moment at which the liquid chromatography detector detects the marker and a second moment at which the first sensor detects the marker, and the flow rate of the liquid flow, determining the total volume of pipelines between the liquid chromatography detector and the first sensor;

wherein the fraction valve is a multi-port valve, which at least includes a liquid inlet connected to the liquid chromatography detector, a liquid discharge port that is selectively in fluid communication with the waste flow path where the first sensor is located, and a separate collection port connected to the collection flow path.

2. The method as claimed in claim 1, characterized in that a pipeline between the liquid inlet of the fraction valve and the first sensor has a known predetermined volume, wherein the method further comprises determining the volume (V) of a pipeline between the liquid inlet of the fraction valve and the liquid chromatography detector on the basis of the total volume and the predetermined volume.

3. The method as claimed in claim 2, characterized in that the fraction collector further comprises a second sensor, and a pipeline between the first sensor and the second sensor has a known inter-sensor pipeline volume (V2), wherein the flow rate of the liquid flow is determined on the basis of a time difference (T3−T2) between the second moment and a third moment at which the second sensor detects the marker, and the inter-sensor pipeline volume (V2).

4. The method as claimed in claim 2, characterized in that the liquid chromatograph further comprises a pump for pumping the liquid flow, and the flow rate of the liquid flow is the pump flow rate of the pump.

5. The method as claimed in claim 1, characterized in that the fraction collector further comprises a second sensor, and a pipeline between the first sensor and the second sensor has a known inter-sensor pipeline volume (V2), wherein the flow rate of the liquid flow is determined on the basis of a time difference (T3−T2) between the second moment and a third moment at which the second sensor detects the marker, and the inter-sensor pipeline volume (V2).

6. The method as claimed in claim 1, characterized in that the liquid chromatograph further comprises a pump for pumping the liquid flow, and the flow rate of the liquid flow is the pump flow rate of the pump.

7. A liquid chromatography system, characterized in that the liquid chromatography system comprises:

a liquid chromatograph comprising:

a marker insertion device for inserting a detectable marker into a liquid flow of the liquid chromatograph, and a liquid chromatography detector located in the liquid chromatograph;

a fraction collector comprising:

a fraction valve arranged after the liquid chromatograph and arranged to define at least two separate downstream flow paths comprising a waste flow path leading to a waste liquid collector and a collection flow path leading to a collection needle, a first sensor arranged after the fraction valve along the waste flow path, the collection needle arranged along the collection flow path, and a control device configured to enable the total volume of pipelines between the liquid chromatography detector and the first sensor to be determined by means of a time difference (T2−T1) between a first moment at which the liquid chromatography detector detects the marker and a second moment at which the first sensor detects the marker, and the flow rate of the liquid flow;

wherein the detectable marker is a bubble, and wherein the marker is configured to be inserted into the liquid flow within the liquid chromatograph, before the liquid chromatography detector, or at least at the liquid chromatography detector;

wherein the fraction valve is a multi-port valve, which at least includes a liquid inlet connected to the liquid chromatography detector, a liquid discharge port that is selectively in fluid communication with the waste flow path where the first sensor is located, and a separate collection port connected to the collection flow path.

8. The liquid chromatography system as claimed in claim 7, characterized in that a pipeline between the liquid inlet of the fraction valve and the first sensor has a known predetermined volume, wherein the control device is configured to enable the volume (V) of a pipeline between the liquid inlet of the fraction valve and the liquid chromatography detector-to be determined on the basis of the total volume and the predetermined volume.

9. The liquid chromatography system as claimed in claim 7, characterized in that the fraction collector further comprises a second sensor, and a pipeline between the first sensor and the second sensor has a known inter-sensor pipeline volume (V2), wherein the control device is configured to enable the flow rate of the liquid flow to be determined on the basis of a time difference (T3−T2) between the second moment and a third moment at which the second sensor detects the marker, and the inter-sensor pipeline volume (V2).

10. The liquid chromatography system as claimed in claim 9, characterized in that the second sensor is arranged after the first sensor along the flow path direction.

11. The liquid chromatography system as claimed in claim 9, characterized in that the liquid chromatograph is connected to the liquid inlet of the multi-port valve through a pipeline, and a pipeline through which the marker flows so as to be detected by the first sensor and the second sensor is connected to the liquid discharge port in the multi-port valve, wherein the fraction valve has a first position in which the liquid inlet is in fluid communication with the liquid discharge port.

12. The liquid chromatography system as claimed in claim 5, characterized in that the liquid chromatography system further comprises a pump for pumping the liquid flow, and the flow rate of the liquid flow is the pump flow rate of the pump.

13. A pipeline volume determination device, characterized in that the pipeline volume determination device comprises:

a liquid chromatography detector located in a liquid chromatograph;

a fraction collector including a fraction valve arranged after the liquid chromatograph and including a collection needle, wherein the fraction valve defines at least two separate downstream flow paths comprising a waste flow path leading to a waste liquid collector and a collection flow path leading to the collection needle;

a marker insertion device for inserting a detectable marker into a liquid flow of the liquid chromatograph;

a first sensor arranged after the fraction valve along the waste flow path; and a control device configured to enable the total volume of pipelines between the liquid chromatography detector and the first sensor to be determined by means of a time difference (T2−T1) between a first moment at which the liquid chromatography detector detects the marker and a second moment at which the first sensor detects the marker, and the flow rate of the liquid flow;

wherein the detectable marker is a bubble, and wherein the marker is configured to be inserted into the liquid flow within the liquid chromatograph, before the liquid chromatography detector, or at least at the liquid chromatography detector;

wherein the fraction valve is a multi-port valve, which at least includes a liquid inlet connected to the liquid chromatography detector, a liquid discharge port that is selectively in fluid communication with the waste flow path where the first sensor is located, and a separate collection port connected to the collection flow path.

14. The pipeline volume determination device as claimed in claim 13, characterized in that a pipeline between the liquid inlet of the fraction valve and the first sensor has a known predetermined volume, wherein the control device is configured to enable the volume (V) of a pipeline between the liquid inlet of the fraction valve and the liquid chromatography detector to be determined on the basis of the total volume and the predetermined volume.

15. The pipeline volume determination device as claimed in claim 13, characterized in that the pipeline volume determination device further comprises a second sensor, and a pipeline between the first sensor and the second sensor has a known inter-sensor pipeline volume (V2), wherein the control device is configured to enable the flow rate of the liquid flow to be determined on the basis of a time difference (T3−T2) between the second moment and a third moment at which the second sensor detects the marker, and the inter-sensor pipeline volume (V2).

16. The pipeline volume determination device as claimed in claim 15, characterized in that the second sensor is arranged after the first sensor along the flow path direction.

17. The pipeline volume determination device as claimed in claim 15, characterized in that the liquid chromatograph is connected to the liquid inlet of the multi-port valve through a pipeline, and a pipeline through which the marker flows so as to be detected by the first sensor and the second sensor is connected to the liquid discharge port in the multi-port valve, wherein the fraction valve has a first position in which the liquid inlet is in fluid communication with the liquid discharge port.

18. The pipeline volume determination device as claimed in claim 13, characterized in that the pipeline volume determination device further comprises a pump for pumping the liquid flow, and the flow rate of the liquid flow is the pump flow rate of the pump.

* * * * *